May 25, 1943. J. P. SEAHOLM Re. 22,327

DISK HARROW

Original Filed June 30, 1939 4 Sheets-Sheet 1

Inventor

JOHN P. SEAHOLM

By Carlson & Hayle

Attorneys

May 25, 1943. J. P. SEAHOLM Re. 22,327
DISK HARROW
Original Filed June 30, 1939 4 Sheets-Sheet 2
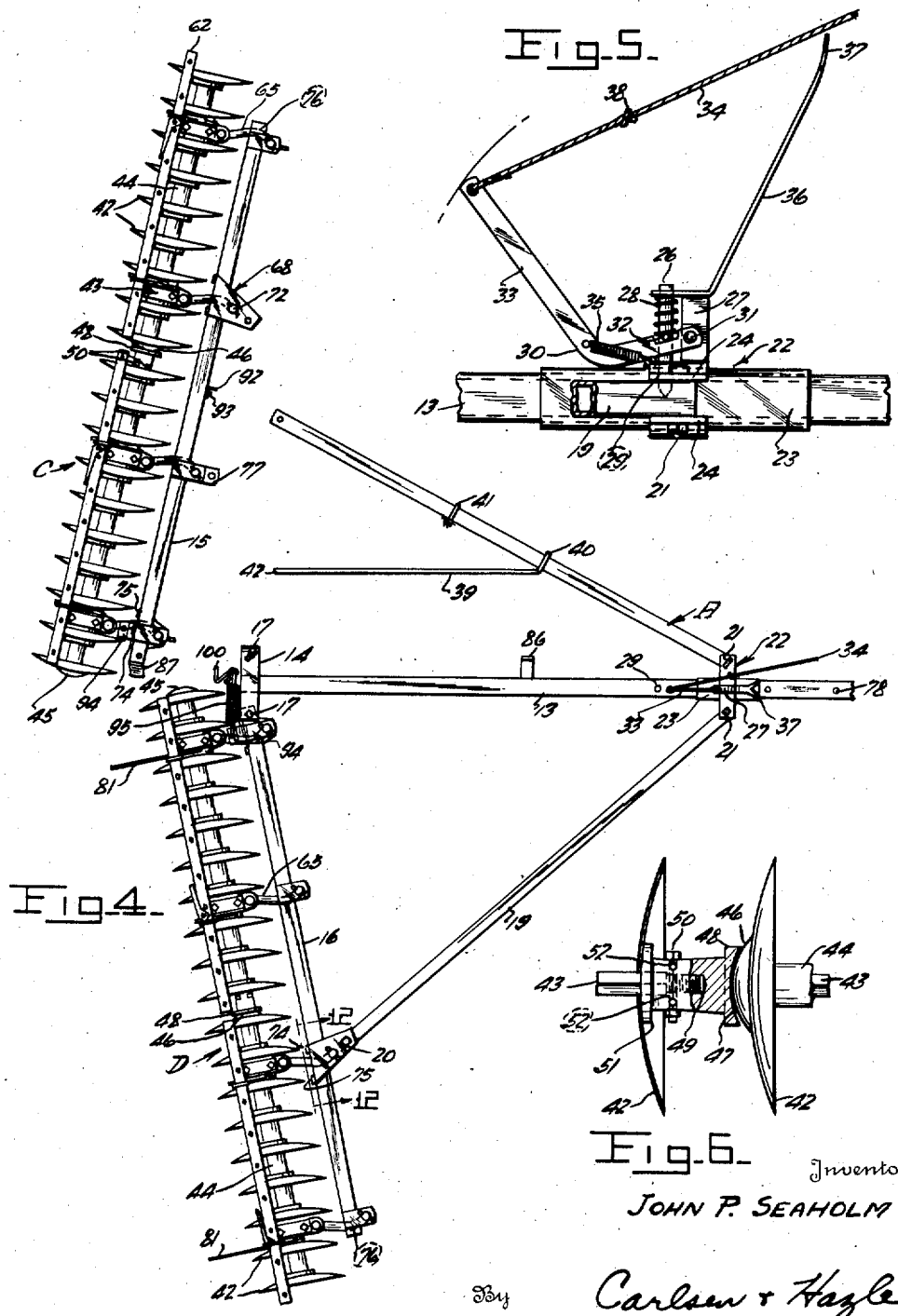
Inventor
JOHN P. SEAHOLM
By Carlson & Hazle
Attorneys May 25, 1943. J. P. SEAHOLM Re. 22,327

DISK HARROW

Original Filed June 30, 1939 4 Sheets-Sheet 3

Inventor

JOHN P. SEAHOLM

By Carlson & Hazle

Attorneys

May 25, 1943. J. P. SEAHOLM Re. 22,327

DISK HARROW

Original Filed June 30, 1939 4 Sheets-Sheet 4

Inventor

JOHN P. SEAHOLM

By Carlson & Hayes

Attorneys

Reissued May 25, 1943 Re. 22,327

UNITED STATES PATENT OFFICE 22,327

DISK HARROW

John P. Seaholm, Moline, Ill., assignor to Minneapolis-Moline Power Implement Company, Minneapolis, Minn., a corporation of Delaware Original No. 2,226,587, dated December 31, 1940, Serial No. 282,091, June 30, 1939. Application for reissue June 26, 1941, Serial No. 399,873

25 Claims. (Cl. 55—81)

This invention relates to improvements in disk harrows.

The primary object of the invention is to provide an improved harrow of the wide cut variety designed to work a maximum width or strip of ground and with means for conveniently reducing the overall width of the harrow for transporting it through gates, along roads and other narrow places. Another object is to provide in a harrow of this kind a novel framework and gang assembly and arrangement wherein the gangs may be outspread to working relation when in use and conveniently adjusted as to their relative angles in this condition; but in which one gang may be uncoupled and connected directly behind the other in tandem relation for transport purposes to thus reduce the width of the harrow at this time to the width of one gang alone. A further object is to provide numerous improvements in draft frame structure and assembly designed to facilitate the operation of adjusting the angle of the gangs, and the operation of changing the harrow from working to transporting conditions.

Another object is to provide a draft frame assembly for the harrow by means of which the draft line may be shifted from its usual central position when the disk gangs are in outspread working positions to a central position with respect to one gang when the other gang is placed in trailing transport position therebehind, to thus maintain proper draft under all conditions and facilitate handling.

Still another and important object is to provide in a harrow of this kind a novel and effective mechanism for adjustably and resiliently resisting the upward thrust produced at the inner ends of the gangs by the reaction of the earth against the angularly disposed disks, to thereby insure a uniform penetration by both inner and outer disks. More particularly it is an object to so design this resisting mechanism that it will be capable of maintaining the gangs as stated but without causing or producing undesirable end thrusts as between the disk units or gangs proper, and thus overcoming objections inherently present in certain harrows as used prior to my invention.

These and other more detailed and specific objects will be disclosed in the course of the following specification, reference being had to the accompanying drawings, in which—

Fig. 4 is a view similar to Fig. 1 but showing one disk gang disconnected from the draft frame prior to being coupled behind the other gang for transport.

Fig. 5 is an enlarged fragmentary side elevation of the latch means for adjusting and locking the draft frame in various positions.

Fig. 6 is a detail view, partially in rear elevation and partially in vertical section, showing the connection and bearing between inner and outer sections of each disk gang.

Figures 1, 2, 3:
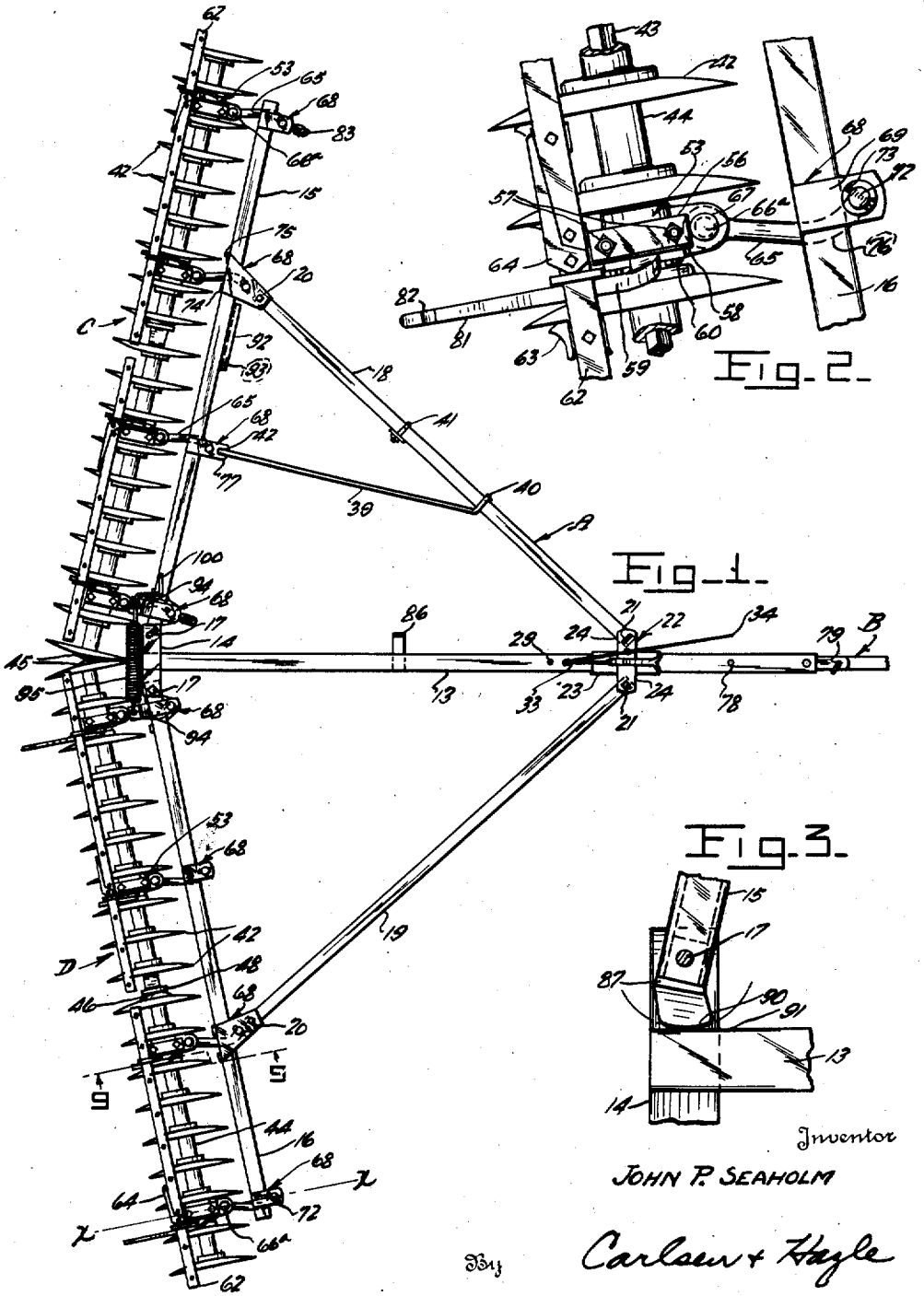
Fig. 1 is a plan view of my improved harrow shown with the gangs at a working angle.
Fig. 2 is an enlarged fragmentary plan view of a portion of one disk gang and draft frame member, showing the bearing and drag link connection between the gang and frame member.
Fig. 3 is an enlarged horizontal sectional view through the releasable connection between the draft tongue and one draft bar or draft frame side member, illustrating the guide block for properly aligning the mounting holes for the removable pin connecting these parts.
Figure 8:
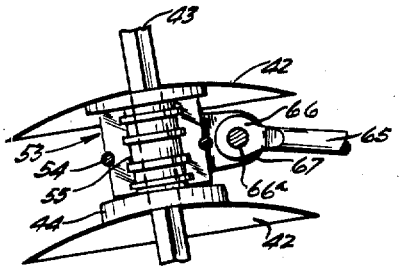
Fig. 8 is a plan view of one disk gang bearing showing the upper bearing section removed and certain parts in horizontal section.

It may be noted that this invention has certain features in common with my United States Patent No. 2,226,586 the application for which was copending with the original application, Serial No. 282,091 hereof; such features being further disclosed in my applications Serial No. 341,867 (now Patent 2,266,819) and Serial No. 338,076, also copending with such original application Serial No. 282,091.

Referring now with more particularity to the drawings, A designates generally the draft frame for connection forwardly to the draw bar B of the tractor (not shown) and C and D represent the respective disk gangs which are, as shown, each of substantial length so that in their outspread positions the harrow will work a wide strip of ground. The advantages of such a harrow will be obvious, but it will be equally obvious that the gangs will be far too wide to pass through an ordinary gate or road, and it thus becomes necessary to reduce this width when the harrow is transported from field to field. This I accomplish by the structure which will now be set forth in detail.

The draft frame comprises a central, generally fore and aft extended main draft member or tongue 13 provided with means at its frontal end for connection to the aforesaid drawbar B and at its rear end with a transverse, laterally extended coupling 14 made up of upper and lower straps welded or otherwise secured to the tongue. Side bars or side draft bars 15 and 16 are pivotally mounted at their inner ends by pins or bolts 17 within this coupling 14 and normally extend outwardly therefrom as shown. Said pivots 17 being vertically axised, it will be evident that these draft bars 15 and 16 may swing forwardly and rearwardly in horizontal planes at each side of the tongue 13. Brace bars 18 and 19 are provided for bracing and adjusting these draft bars and are pivotally connected at 20 thereto and extend forwardly in converging relation to points 21 of pivotal connection with a slidable bearing member 22 on the tongue. This bearing member has a tubular portion 23 slidably fitting the tongue 13 and laterally projecting and vertically spaced ears 24 between which the forward ends of the brace bars are received and pivoted by pins or bolts forming the pivots 21 as clearly shown. Inasmuch as lengthwise movement of the bearing member 22 on the tongue is thus readily possible, adjustment of the relative outspread angle of the draft bars 15 and 16 may be made, and for locking the parts in adjusted positions I provide a latch pin 26 slidably mounted in a bracket 27 secured atop the bearing member and supporting the pin for downward engagement under influence of the expansion coil spring 28, with any one of a number of holes 29 provided in the tongue 13 for its reception. A lever 30 is pivoted at 31 on the bracket 27 and engages under a cross stud 32 on the pin 26 so that by swinging this lever upwardly the pin may be raised and disengaged from the holes in the tongue while angle adjustments are being made. For this purpose the lever is turned angularly upward at its rear end 33 and a pull rope 32 is secured thereto so that the lever may be raised from a remote position such as the seat of the tractor pulling the harrow. A spring 35 normally resists this movement and returns the lever to inoperative position when adjustments have been made. However, I further provide an arm 36 extended upwardly from the bracket 27 and provided with a fork 37 with which a knot 38 in the pull rope 34 may be engaged to hold the pin 26 clear when so desired.

In addition to the foregoing the draft frame also includes a guide or gauge rod 39 having slidable connection by its loop 40 over the brace bar 18 forwardly of a rigidly mounted stop yoke 41 and which is adapted to be releasably and pivotally connected at its rear downwardly turned end 42 with the draft bar 15, as shown.

The disk gangs C and D are substantially identical in construction and differ mainly in the fact that the respective disks 42 and certain other parts are reversed in position for their proper operation. Each gang is made up of a series of these disks 42 mounted upon axles 43 and spaced apart thereon by spacing spools 44 placed over the axles between the disks in the usual manner. The ends of the axles are of course provided with means for locking the assembly together, and at the inner ends of the gangs this means takes the form of rounded or spherical bumpers 45 as shown.

It will be noted that each disk gang is made up of a pair (or more) of sections disposed end to end and provided with complementary bearing means at their meeting ends. Such bearing means as best shown in Fig. 6 comprises rounded bumpers 46, quite similar to the aforesaid end bumpers 45, secured at the inner ends of the outer gang sections and fitting the concaved and rounded bearing surfaces 47 of the end bearings 48 secured at the outer ends of the inner gang sections. By this arrangement the inner and outer gang sections are permitted complete freedom of differential rotation as the harrow is turned in the field, as will be readily evident. However, it is not contemplated that the gang sections of each unit should have any relative flexibility of movement vertically due to uneven contour of land, and the gangs are effectively restrained against such action by their connection to the draft frame, as will hereinafter appear.

This sectional gang assembly has been described and claimed in some detail in my aforesaid copending application resulting in United States Patent No. 2,226,586.

In the present instance the end bearings 48 are threaded at 49 on the outer ends of the inner gang section axles 43 and are locked against displacement by the insertion of small bolts 50 between the adjacent ends of the said bearings and collars 51 which engage the axles and are locked against rotation thereon. Grooves 52 are provided in the meeting ends of the bearings and collars for the reception of these bolts 50.

Each individual gang section is provided with a pair of bearings 53 which comprise upper and lower sections or member releasably secured together by U-bolts 54 and which have grooves 55 at their mating faces to define a bearing for the spools 44 mounted between the disks. At the upper ends the U-bolts are passed through angle irons 56 which are locked in place by nuts 57 turned down on the bolts, as clearly shown. The upwardly turned webs 58 of the angle irons thus serve as mountings for bracket arms 59 which are bolted at 60 thereto and extend upwardly and rearwardly between the adjacent disks 42.

At their upper rear portions these arms 59 are provided with slots 61 through which are slidably mounted the scraper bars 62 carrying scraper blades 63 for cleaning the concaved sides of the disks. Adjustment levers 64 on these bars 62 permit adjustment of the scrapers toward and away from the disks, and it will be understood that weight boxes of the usual kind (not here shown) may also be supported from these bracket arms if their use is desired.

The disk gangs thus constructed are arranged rearwardly of, and parallel to, the respective draft bars 15 and 16 and are connected thereto for draft purposes by drag links 65, one of which extends forwardly from each bearing 53 and is pivotally attached thereto by placing its flattened rear end 66 between spaced ears 67 on the frontal sides of the bearings and inserting a vertical pin 66a through the ears and link. Forwardly of each disk gang bearing 53 the respective draft bars 15 and 16 are provided with bracket members designated generally at 68 and each of which comprises essentially upper and lower forwardly extended straps 69—70, welded or otherwise secured to the upper and lower surfaces of the draft bars. These bracket members are each provided forwardly of the draft bars with vertically aligned and axised bearing openings 71 through which are journaled the upwardly turned forward ends 72 of the drag links 65. Cotter pins 73 retain the links in this assembly so that they extend rearwardly beneath the draft bars 15 and 16 to the disk gangs and connect said gangs to the draft frame.

It will be evident that this mode of connection of the disk gangs C and D to the draft bars 15 and 16 prevents relative vertical displacement between these parts while still allowing the disk gangs to shift freely in an endwise and horizontal direction behind the draft bars. This shifting action is, however, limited to the point that the disk edges can never strike the draft bars, by means of inner and outer stops or stop lugs 74—75 turned downwardly from the lower straps 70 of the innermost and outermost bracket members 68 into the path of the drag links 65 as shown. Attention is also directed to the fact that the drag links are curved or offset toward their frontal ends and in a direction away from the adjacent inner disks 42, as designated at 76, so that these disk edges will not strike the drag links in the extreme outwardly shifted position of the gangs.

The next to the outermost bracket members 68 are extended forwardly to receive the bolts forming the rear pivot connections 20 of the brace bars 18—19 and additionally the next inner bearing member on the draft bar 15 is provided with an apertured extension 77 for the releasable and pivotal reception of the rear end of the guide rod 39.

In the operation of the harrow as thus far described it will be readily appreciated that in the wide spread and forwardly angled position of the gangs C and D as shown in Fig. 1, a wide strip of ground may be worked each trip across the field. This relative angle of the disk gangs may be varied from a non-working position (not shown) but at which they are in axial and transverse alignment, to a position even forwardly of that shown, by simply releasing the latch pin 26 in the manner described and pulling forwardly or rearwardly on the tractor. This action, due to the resistance of the gangs, will then cause a shifting movement of the bearing member 22 on the draft tongue 13 and a corresponding variation of the angle of the gangs.

During such operations the bumpers 45 at the inner ends of the disk gangs remain in abutting relation and the opposing end thrusts upon the respective gangs by their action in the ground causes the gangs to maintain a transverse equilibrium behind the draft frame. However, should either gang meet with less or more resistance due to variations in the texture or characteristics of the soil the gangs may shift endwise behind the draft frame within the limits set by engagement of the drag links 65 with the respective stops 74—75, and this action will in no way interfere with the disking operation.

The bearings 53 and bracket members 68 are so located with respect to each other and to the center of the harrow that, in one working angle of the gangs shown in Fig. 1, the pivot points 66*a* and 72 of the drag links 65 will be disposed in a plane or line at right angles to the axes of the gangs as represented at X—X in Fig. 1. The draft forces are thus transmitted to the disk gangs at right angles to the bearing surfaces and in such manner that the bearings are relieved of end thrust which would otherwise be set up by these forces, and which end thrust is the most troublesome cause of wear in disk harrow bearings. This feature is more fully disclosed in my aforesaid Patent No. 2,226,586.

Figure 7:
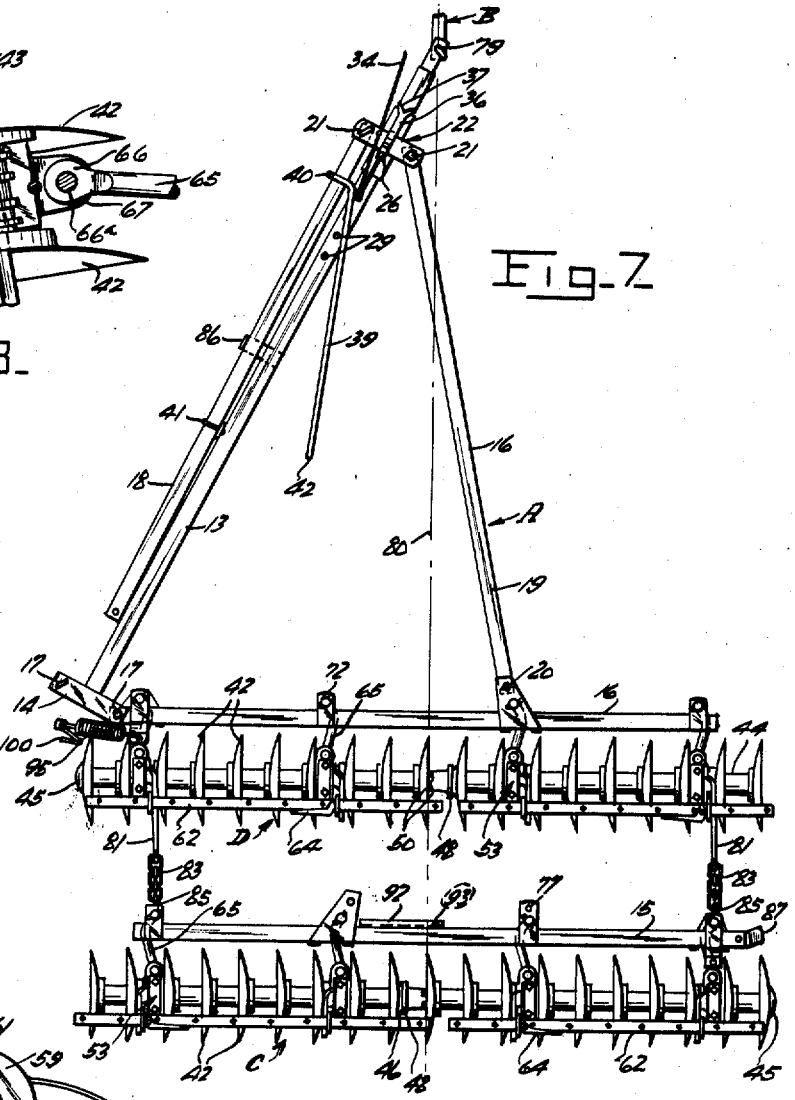
Fig. 7 is a plan view of the harrow in transport position, showing the gangs in aligned relation, front to rear, and showing the draft frame shifted to bring the draft line over to the center of the gangs.
Figure 9:
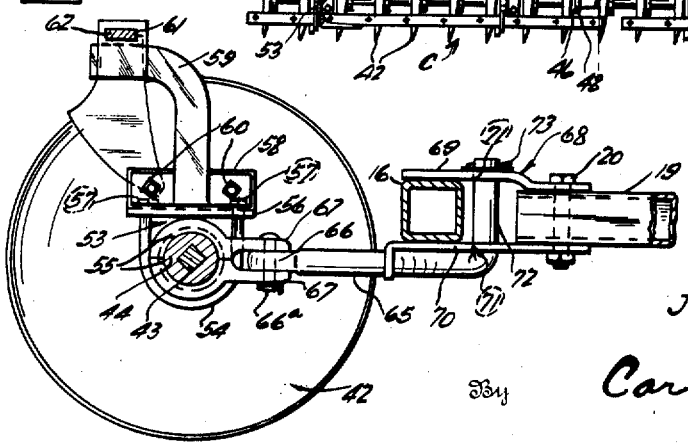
Fig. 9 is an enlarged cross section along the line 9—9 in Fig. 1.

In the present invention I provide, as means for reducing the effective width of the harrow while transporting, the arrangement whereby either disk gang, here shown as the gang C, may be uncoupled, placed immediately behind the other gang to run in tandem formation in the path thereof, and coupled to the remainder of the harrow. For this purpose the brace bar 18 and guide rod 39 are disconnected from the draft bar 15 and this bar 15 is itself disconnected from the coupling 14, thus freeing the entire gang C and draft bar 15 from the harrow, as shown in Fig. 4. The latch pin 26 is then released and the tractor is moved rearwardly, causing the bearing member 22 to slide forwardly on the draft tongue 13 until the pin may be reengaged with a forwardly located opening 78 in the tongue. This action, causing the tongue 13 and brace bar 19 to swing on the pivots 17 and 20, results in the shifting of the frame laterally and over ahead of the single connected gang section D until the draft pin 79 reaches a position in alignment with the front to rear draft line 80 passing through the center of the gang D as clearly shown in Fig. 7. It is thus made possible to pull the single disk gang in an efficient manner and in proper trailing position, and by proper maneuvering of the tractor this gang may be backed up ahead of and parallel to the disconnected gang C.

The inner and outer bracket arms 59 of the pulling gang D, as it may be termed, are extended rearwardly and downwardly as shown at 81 and are notched at 82 to receive drag or tow chains 83 which are connected at 84 to fasteners here shown as being eyed pins 85 welded to the inner and outer bracket members 68 of the draft bar 15. These chains when thus connected serve to pull along the gang C behind the harrow and it will now be evident that the harrow occupies only as much transverse space as one gang alone, and it may therefore be pulled readily through gates, narrow roads, and the like.

When not in use in this transport position of the harrow, the brace bar 18 is folded inwardly alongside the tongue 13 and rests in a hanger 86 secured thereto. The guide rod 39 is then rested over the tongue as shown.

Figure 10:
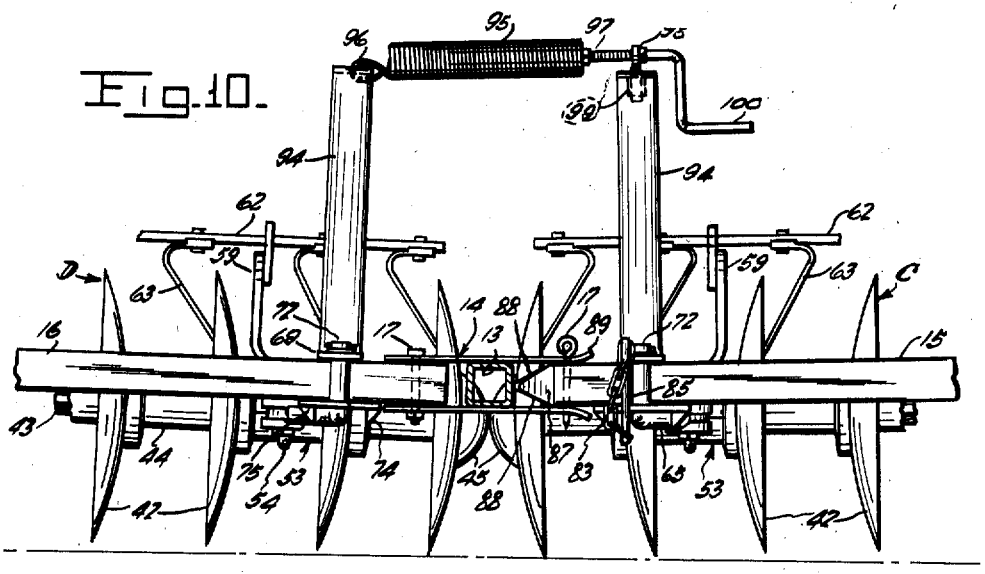
Fig. 10 is an enlarged frontal elevation of a central portion of the disk gangs, showing the draft tongue in cross section, and illustrating the action of the spring device in resisting upthrust at the inner ends of the disk gangs.
Figure 12:
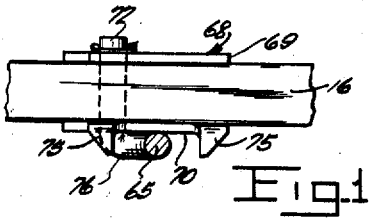
Fig. 12 is an enlarged fragmentary section along the line 12—12 in Fig. 4.
Figure 11:
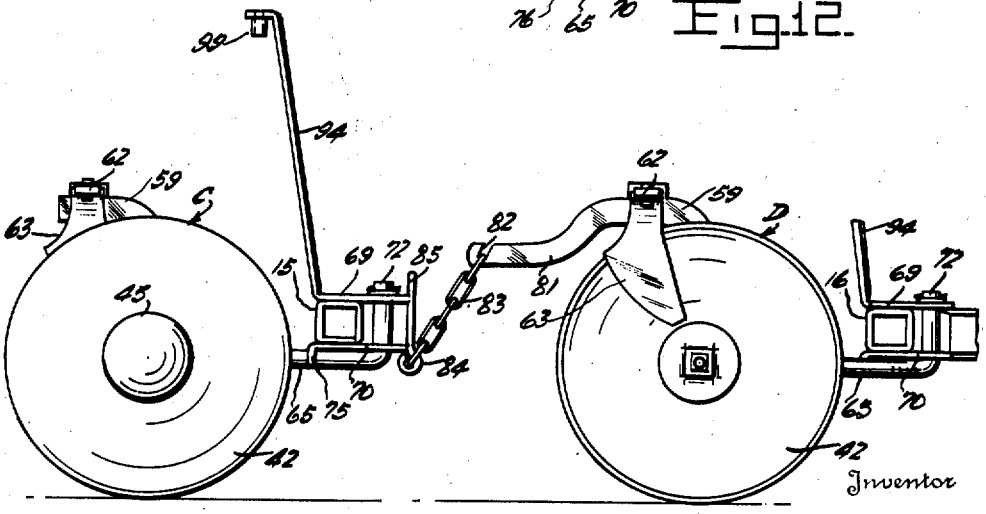
Fig. 11 is an enlarged end view of the disk gangs in the transport position shown in Fig. 7.

To restore the harrow to working condition the chains 83 are uncoupled and are hooked at their free ends over the extended upper ends of the pins 85 to keep them in the clear as shown in Fig. 10. The harrow is then pulled forward and backed up to a position somewhat alongside the gang C and the brace bar 18 is disconnected at 21 and recoupled at 20 to the draft bar 15. The guide rod 39 is also connected at its rear end 42 to this draft bar. The tractor is now maneuvered until it is possible to reconnect the brace bar 18 at 21 and the tractor is then pulled forward causing the draft forces to pull the disk gang C inwardly toward the other gang D. The stop 41 is so located that the triangular bracing effect of the brace bar and guide rod 39 will hold the draft bar 15 at the proper angle and proper fore and aft position to cause its inner end to properly enter the coupling 14. Also to facilitate this operation the inner end of said draft bar 15 is provided with a rigidly mounted guide member or block 87 which is tapered on upper and lower sides as indicated at 88 to guide itself into the flared mouth 89 of the coupling. Furthermore, the end of this guide member 87, as best shown in Fig. 3, is rounded at 90 on a radius struck from the center of the connecting pin 17 to bear against the adjacent side face 91 of the tongue 13 and thereby gauge the position of the draft bar end to the point that the mounting holes for the pin will fall into proper registry in any angular position of the gangs. The pin 17 may thus be readily inserted to complete the recoupling of the harrow.

The latch pin 26 is then withdrawn from the opening 78 and the harrow is pulled forward, causing the tongue 13 to swing back to a center position between the gangs and along the draft line, and the angle of the gangs may then be set and adjusted as described.

It will be noted that the foregoing adjustments may all be made by maneuvering the tractor and harrow and without attempting to lift or shift the disk gangs by hand. The draft bar 15 is provided with a leg iron 92 pivotally connected at 93 to normally lie along the frontal side of the bar but which may be swung downwardly at its free end as shown in Fig. 4 to engage the ground and support this bar and the disk gang C while it is being coupled or uncoupled in the manner described.

In the disking operation there is, as well known, an inward endwise thrust exerted upon the lower working edges of the disks as they travel through the ground. This force, brought to bear upon the bumpers 45 spaced upwardly from the ground by half the diameter of the disks, has a tendency to urge the inner ends of the disk gangs upwardly and, unless counteracted by some means, results in uneven penetration of inner and outer disks.

In accordance with my present invention I provide each draft bar 15 and 16 with an upwardly and rearwardly extended arm 94 between the upper ends of which is arranged a retractile coil spring 95 which exerts an inward pull upon the arms. This action being transmitted to the draft bars 15 and 16 exerts a relatively upward pull or lift upon the outer ends of the bars rocking them slightly on their inner end pivots 17 and, through the drag links 65, causes a downward pressure on the inner ends of the disk gangs C and D to counteract the upthrust thereat.

The spring 95 is hooked at 96 to one arm 94 while at its other end it has an adjusting screw 97 provided with a plug bearing 98 which may be removably inserted in a sleeve 99 secured to the other arm 94. A crank 100 at the end of the screw 97 permits the tension of the spring to be adjusted to suit the working conditions and of course the plug 98 may be readily removed from the sleeve 99 when the gang C is placed in transporting position, as hereinbefore described.

The arms 94 are located near the inner ends of the draft bars 15 and 16 and may well be formed as extensions of the innermost bracket members 68. In any event, and this is an important point, the arms incline rearwardly to dispose the spring in a plane located rearwardly of the pivots 17 of the draft bars. As a result the spring 95 is stretched as the disk gangs C and D are moved forwardly to working angles and the tension of the spring is thus automatically adjusted in accordance with the working angle. In other words, as the end thrust on the gangs is increased, by increase in the working angle, the additional spring force necessary to counteract the augmented upthrust at the center of the gangs is automatically obtained.

Attention is called to the fact that the draft bars 15 and 16 are not an integral part of the disk gangs C and D but rather that these bars constitute simply draft means for said gangs. The arms 94 being then mounted on the draft bars without direct connections to the gangs, per se, it follows that all the forces exerted by the spring 95, while entirely effective in withstraining the disk gangs against upward displacement, are nevertheless absorbed by the connections at 17 of these draft bars with the tongue 13. The bearings of the disk gangs are thus relieved of end thrust from the spring action and the life of the bearings is very materially increased. It will also be seen that by this construction the several disks and gang sections will be controlled and maintained at a uniform depth of soil penetration, and without in any way interfering with the aforesaid freedom of the gang sections for differential rotation, nor with the freedom which the gangs and gang sections have for limited endwise shifting movements by reason of their flexible connections through drag links 65 with the draft bars 15 and 16.

It is thought that further details as to the construction and operation, as well as the utility of my harrow, will be apparent to those skilled in the art, without further description herein.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A disk harrow structure comprising a pair of disk gangs operatively connected and adjustable from wide spread working positions at opposite sides of a medial draft line with their inner ends transversely opposed to tandem positions one behind the other whereby they will traverse a common path of travel, and means for releasably connecting the gangs in tandem position.

2. A disk harrow structure comprising a draft frame, a pair of disk gangs connected to the draft frame and normally disposed in wide spread directly opposite working positions, and one of the said gangs being arranged for adjustment to a position directly behind the other gang, and means independent of the draft frame for connecting the gangs in the tandem position.

3. In a disk harrow, the combination of a draft frame, a pair of disk gangs connected to the said frame and adjustable to wide spread working positions with their inner ends in transversely opposed end to end contact, one of the said gangs being detachable from the draft frame for positioning in tandem relation directly behind the other gang so as to traverse the same path of travel, and means for releasably connecting the gangs in said tandem relation.

4. In a disk harrow, the combination of a draft structure, a pair of disk gangs adjustably connected to the draft structure for operation at opposite sides of a medial draft line and with the axes of the disks intersecting at said draft line, one of the disk gangs being detachable from the draft structure for disposal in tandem position behind the other gang and in fore and aft alignment therewith, and pulling means on the gangs for releasably connecting the same in said tandem positions.

5. A disk harrow comprising a pair of disk gangs normally disposed in wide spread working positions and with the axes of the disks intersecting at the medial line between the gangs, a draft frame connected to the gangs, and the said frame being adjustable transversely to shift the draft line from a central position with respect to both gangs and coincident with respect to said medial line to a central position with respect to one gang.

6. A disk harrow comprising a pair of disk gangs normally disposed to travel in laterally adjacent paths and with their respective innermost disks in abutting contact with each other, a draft frame structure for applying draft forces to the disk gangs normally in a line extending forwardly from the inner ends of the gangs, and the said draft frame structure being adjustable transversely to shift said draft line to a position forwardly in alignment with a medial portion of one disk gang when the other gang has been removed from its normal relatively lateral position with respect thereto.

7. A disk harrow comprising a draft member normally disposed in a plane parallel with the line of travel, disk gangs connected to said draft member and extending in opposite directions therefrom, one of the said gangs being detachable and capable of disposal in tandem relation behind the other gang, and means for adjusting the said draft member transversely at its frontal end for shifting the line of draft to a position substantially coinciding with a fore and aft line through the center of the tandem gangs.

8. A disk harrow comprising a fore and aft extending center draft member, disk gangs pivotally connected with the rear portion of the draft member and normally disposed at working angles at each side thereof, one of the said gangs being detachable from the draft member for positioning behind and connection to the other gang, and a brace member extended angularly between the last mentioned gang and the draft member and adjustable with respect to the draft member to secure the front end of the latter in a position forwardly of the center of the said other gang.

9. A disk harrow comprising a draft member normally disposed in a fore and aft position, disk gangs pivotally connected with the rear portion of the draft member and extending laterally to opposite sides therefrom, one of the said gangs being detachable from the draft member for positioning behind the other gang, a brace member extended angularly between the last mentioned gang and the draft member and adjustable for securing the forward end of the draft member in a position forwardly of the center of such last mentioned gang, and means for locking the brace member in adjusted positions with respect to the draft member.

10. A disk harrow comprising a draft member, a pair of disk gangs connected to a rear portion of the draft member and adjustable to wide spread working position at opposite sides thereof, brace members extending angularly from the disk gangs and converging forwardly to points of adjustable connection with the draft member, one of the said gangs being detachable from the draft and brace members and movable to a tandem position behind the other gang for transport purposes, means for detachably connecting the gangs when in tandem positions, and the brace member connected to said other gang being adjustable on the draft member to secure the forward end thereof in fore and aft alignment with the center of the gangs when in their transport position.

11. A disk harrow comprising a draft tongue having a draft connection at its forward end, draft bars pivotally connected at their inner ends to the rear of the tongue and normally disposed in outwardly extended positions, disk gangs connected to the draft bars, brace members connected to outer portions of the draft bars and extending in converging relation forwardly therefrom, a bearing member connected to the brace members and adjustable forwardly and rearwardly on the tongue, one of the disk gangs and draft bars being detachable from the tongue and brace member for positioning behind and attachment to the other gang during transport of the harrow, and the said bearing member being arranged for adjustment forwardly on the draft member to thereby secure the tongue when the same is swung laterally on its pivotal connection with the connected draft bar to a point at which the draft connection will be disposed in a line perpendicular to the central portion of the disk gangs when in their transport position.

12. In a disk harrow, a longitudinally extending draft tongue, draft bars pivotally connected at inner ends to the tongue and arranged in outspread relation at opposite sides thereof, disk gangs connected to the draft bars, one of the said draft bars being detachable from the tongue to permit disposing the disconnected disk gang behind the other gang, and the connection between this detachable draft bar and the tongue comprising spaced mounting members extended laterally from the tongue, and a coupling member secured to the inner end of the draft bar and tapered toward its inner end to guide the bar into engagement between said mounting members when reconnecting the bar to the tongue.

13. In a disk harrow, a draft tongue, draft bars pivotally connected at inner ends to a rear portion of the tongue, disk gangs connected to the draft bars, one of the said draft bars having a releasable connection with the tongue, and said connection including spaced mounting members extending from one side face of the tongue, a coupling member on the inner end of the draft bar adapted to fit between said coupling members, a removable pin for pivotally connecting the said coupling member with the mounting members, and the inner extremity of the coupling member being rounded on a radius concentric with respect to the axis of the mounting pin for engaging the adjacent side face of the tongue.

14. In a disk harrow, a draft tongue, draft bars connected at inner ends to the tongue and arranged in outspread relation, disk gangs connected to the draft bars, one of said draft bars being detachable from the tongue permitting its connected gang to be arranged in tandem relation behind the other gang, brace bars connected to the draft bars at outwardly spaced points and extending forwardly for connection to the draft tongue, one brace bar being detachably connected to both the tongue and the said detachable draft bar, a guide rod slidably connected to this brace bar and detachably connected to said detachable draft bar, and a stop on the said brace bar for engaging the guide rod and causing the same to act as a guide for aligning the inner end of the detachable draft bar with its point of connection with the tongue.

15. In a disk harrow adapted to be propelled forwardly and rearwardly by a draft force, a tongue, draft bars connected at inner ends to the tongue in outwardly spread positions, disk gangs connected to the draft bars, one of the said bars being detachable from the the tongue permitting the connected gang to be arranged in tandem behind and connected to the other gang for transport purposes, an adjustably connected brace bar and guide rod for connection with the draft bar when the same is disposed substantially in outspread position alongside the tongue, the said brace bar being pivotally connected at a forward point to the tongue, and the parts being so constructed and arranged that the brace bar and guide rod will swing the draft bar and gang into proper position for connection to the tongue when the harrow is pulled forwardly.

16. A disk harrow, comprising a draft device, a pair of disk gangs connected to said draft device and normally disposed at opposite sides thereof, one of the gangs being detachable from the draft device for arrangement in tandem directly behind the other gang during transport of the harrow and so that the total width of the harrow will not be greater than the length of one gang, and draft chains normally carried by the detachable gang and adapted for connection to the other gang when the gangs are in the tandem positions.

17. A disk harrow, comprising a draft tongue, draft bars connected to the tongue and normally extending laterally therefrom, disk gangs connected to the draft bars, one of the said bars being detachable from the tongue to permit its connected gang to be arranged in tandem behind the other gang during transport of the harrow, draft members carried by the disk gang which remains connected to the draft tongue, and chains connected to the detachable gang for releasable engagement with the said draft members to act as draft connections between the gangs when in their tandem positions.

18. A disk harrow comprising a draft tongue, draft bars connected to the tongue and normally arranged in outwardly extending positions, disk gangs connected to the draft bars and arranged in parallelism therewith, one of the said draft bars and its connected gang being detachable from the tongue for connection in tandem relation behind the other gang, and means on the said detachable draft bar for supporting the same in position for connection to either the other disk gang or for reconnection to the tongue.

19. In a disk harrow, the combination of a pair of oppositely extending disk gangs, a draft structure for pulling the gangs and including draft bars pivotally connected at inner ends and connected to said gangs, one of the draft bars and connected gang being detachable from the draft structure for arrangement behind the other gang in tandem relation, arms supported by inner portions of the draft bars, a spring connecting the arms for exerting vertical force on the gangs, and the said spring being detachable from one of the arms when the disk gangs are arranged in tandem relation.

20. In a disk harrow, a pair of oppositely extending disk gangs, draft means including a pair of horizontal draft members extending longitudinally of and forwardly with respect to the respective gangs, spring means connecting the draft members and tending to resist displacement thereof from a horizontal plane, and links connecting the gangs to the respective draft members, said links being operative to maintain relative vertical positions of the gangs and draft members while permitting limited endwise movements of the gangs with respect to the draft members.

21. In a disk harrow, oppositely extending gangs, oppositely extending draft bars disposed in parallelism with the respective gangs, draft elements connecting the gangs and draft bars and having freedom for movement to permit endwise shifting of the gangs with respect to the bars, and spring means connecting the draft bars and operative therethrough and through said draft elements to resist upthrust at inner ends of the gangs.

22. In a disk harrow, a draft frame including a pair of outwardly extending draft bars pivotally associated at their inner ends for relative angling adjustment, disk gangs disposed rearwardly of the bars and connected thereto by links having freedom for limited oscillating movement to thereby permit endwise shifting of the gangs with respect to the draft bars, and force exerting spring means operatively connecting the draft bars to resist upthrust imparted to corresponding ends thereof by the disk gangs through said links.

23. In a disk harrow, a draft frame including a pair of outwardly extending draft bars pivotally associated at their inner ends for relative angling adjustment, disk gangs disposed rearwardly of the bars and connected thereto by links having freedom for limited oscillating movement to thereby permit endwise shifting of the gangs with respect to the draft bars, and spring means operatively connecting the draft bars in a manner tending to depress corresponding ends of the draft bars below the level of the opposite ends.

24. In a harrow, a draft tongue, a pair of draft bars extending outwardly from the tongue and pivotally secured at their inner ends thereto for angling adjustment in a horizontal plane, disk gangs disposed behind the respective draft bars and for attachment thereto for angling adjustment therewith, links connecting the gangs and bars and providing connections permitting endwise shifting of the gangs with respect to the bars, and resilient means connecting the draft bars in a manner to counteract upthrust imparted to ends thereof by the disk gangs through the said connecting links.

25. In a harrow, a draft tongue, a pair of draft bars extending outwardly from the tongue and pivotally secured at their inner ends thereto for angling adjustment in a horizontal plane, disk gangs disposed behind the respective draft bars and for attachment thereto for angling adjustment therewith, links connecting the gangs and bars and providing connections permitting endwise shifting of the gangs with respect to the bars, and yieldable means for resisting the upthrust created at corresponding ends of the gangs by the reaction of earth to the operation of the disks therein.

JOHN P. SEAHOLM.